(12) United States Patent
Kaatrasalo (10) Patent No.: US 12,000,430 B2
(45) Date of Patent: Jun. 4, 2024

(54) JOINT ELEMENT PROVIDED WITH SWING DAMPENER BRAKE, JOINT ASSEMBLY COMPRISING THE JOINT ELEMENT, AND MACHINE COMPRISING THE JOINT ASSEMBLY

(71) Applicant: PONSSE OYJ, Vieremä (FI)

(72) Inventor: Tero Kaatrasalo, Vieremä (FI)

(73) Assignee: PONSSE OYJ, Vieremä (FI)

( * ) Notice: Subject to any disclaimer, the term of this patent is extended or adjusted under 35 U.S.C. 154(b) by 596 days.

(21) Appl. No.: 17/293,520

(22) PCT Filed: Nov. 14, 2019

(86) PCT No.: PCT/FI2019/050811
§ 371 (c)(1),
(2) Date: May 13, 2021

(87) PCT Pub. No.: WO2020/099722
PCT Pub. Date: May 22, 2020

(65) Prior Publication Data
US 2022/0025924 A1 Jan. 27, 2022

(30) Foreign Application Priority Data
Nov. 15, 2018 (FI) ...................................... 20185964

(51) Int. Cl.
*F16C 11/04* (2006.01)
*B66C 3/00* (2006.01)
(Continued)

(52) U.S. Cl.
CPC .............. *F16C 11/04* (2013.01); *B66C 3/005* (2013.01); *F16D 55/38* (2013.01); *F16D 59/00* (2013.01);
(Continued)

(58) Field of Classification Search
None
See application file for complete search history.

(56) References Cited

U.S. PATENT DOCUMENTS 4,335,914 A    6/1982   Korbel
4,417,759 A    11/1983   Pierrot, III et al.
(Continued)

FOREIGN PATENT DOCUMENTS

EP    1 551 748    1/2009
EP    2 570 379    3/2013
(Continued)

OTHER PUBLICATIONS

International Search Report for PCT/FI2019/050911 dated Feb. 7, 2020, 7 pages.
(Continued)

*Primary Examiner* — Melanie Torres Williams
(74) *Attorney, Agent, or Firm* — Nixon & Vanderhye PC (57) ABSTRACT

A joint element provided with a swing dampener element and comprising a first joint part, a second joint part, and a swing dampener brake. The second joint part comprises a second end part which is detachably fixed to a first end part of the second joint part by a joint part coupling which is adapted to allow the second end part to be moved in an axial direction to a detached position in relation to the first end part, the detached position allowing replacement of active components of the swing dampener brake while the first end part remains bearing-mounted to the first joint part, the active components of the swing dampener brake comprising at least one first brake disc member and at least one second brake disc member.

15 Claims, 4 Drawing Sheets

(51) Int. Cl.
  *F16D 55/38*   (2006.01)
  *F16D 59/00*   (2006.01)
  *A01G 23/00*   (2006.01)
  *E02F 9/00*    (2006.01)
  *F16D 121/14*  (2012.01)
  *F16D 125/40*  (2012.01)
(52) U.S. Cl.
  CPC .............. *A01G 23/00* (2013.01); *E02F 9/006* (2013.01); *F16D 2121/14* (2013.01); *F16D 2125/40* (2013.01)

(56)              References Cited

U.S. PATENT DOCUMENTS 4,715,641 A     12/1987  Palmer
  9,067,764 B2 *   6/2015  Martinsons ............. F16F 7/023

FOREIGN PATENT DOCUMENTS

EP        2 824 059      1/2015
  FI           71714      10/1986
  WO       2009/151365    12/2009
  WO       2012/108750     8/2012

OTHER PUBLICATIONS

Written Opinion of the ISA for PCT/FI2019/050911 dated Feb. 7, 2020, 8 pages.
Search Report for FI20185964 dated May 8, 2019, 2 pages.

* cited by examiner

Joint element provided with swing dampener brake, joint assembly comprising the joint element, and machine comprising the joint assembly This application is the U.S. national phase of International Application No. PCT/FI2019/050811 filed Nov. 14, 2019 which designated the U.S. and claims priority to FI Patent Application No. 20185964 filed Nov. 15, 2018, the entire contents of each of which are hereby incorporated by reference.

FIELD OF THE INVENTION

The invention relates to a joint element with a swing dampener brake.

In machines that have an operative head placed at an end of a boom, it is known to provide the boom with a joint element equipped with a swing dampener brake. A joint element provided with a swing dampener brake dampens the swinging of the operative head in relation to the boom, making it easier to control the operative head. A machine provided with a boom may be e.g. a harvester whereby the operative head is a harvester head, or a grab machine whereby the operative head is a grab.

A known joint element provided with a swing dampener brake is disclosed in publication EP2570379. The problem with the joint element disclosed in said publication is that when the joint element has been installed in a joint assembly of the boom, servicing of the swing dampener brake is difficult. Servicing requires either dismantling the entire joint element or removing the hydraulic hoses installed between the joint elements.

BRIEF DESCRIPTION OF THE INVENTION

It is an object of the invention to develop a joint element with a swing dampener brake so that the aforementioned problem may be solved. An additional object of the invention is to develop a joint assembly comprising a joint element, and a work machine comprising the joint assembly. The objects of the invention are achieved with a joint element provided with a swing dampener brake, a joint assembly comprising the joint element, and a work machine comprising the joint assembly, which are characterized by what is stated in the independent claims. Preferred embodiments of the invention are disclosed in the dependent claims.

The invention is based on providing a joint element with a swing dampener brake, which comprises a first joint part and a second joint part so that the second joint part comprises a first end part and second end part which is detachably fixed to the first end part by a joint part coupling which is adapted to transfer torque between the first end part and the second end part, and the joint part coupling is adapted to allow the second end part to be moved in the axial direction to a detached position in relation to the first end part, the detached position allowing the replacement of active components of the swing dampener brake while the first end part remains bearing-mounted to the first joint part.

An advantage of the joint element with a swing dampener brake according to the invention is that when the joint element has been installed in the joint assembly of the boom, the servicing of the swing dampener brake is possible from outside the joint assembly without the need to remove or move out of the way the hydraulic hoses or other flexible, elongated elements installed between the joint elements of the joint assembly, and the joint element maintaining its ability to bear a radial load when the swing dampener brake is being serviced. The load bearing capacity in the radial direction is maintained, because the first end part of the second joint part stays bearing-mounted to the first joint part for the entire duration of the servicing procedure.

BRIEF DESCRIPTION OF THE DRAWINGS

The invention will now be described in more detail in connection with preferred embodiments and with reference to the accompanying drawings, in which.

DETAILED DESCRIPTION OF THE INVENTION

Figure 1:
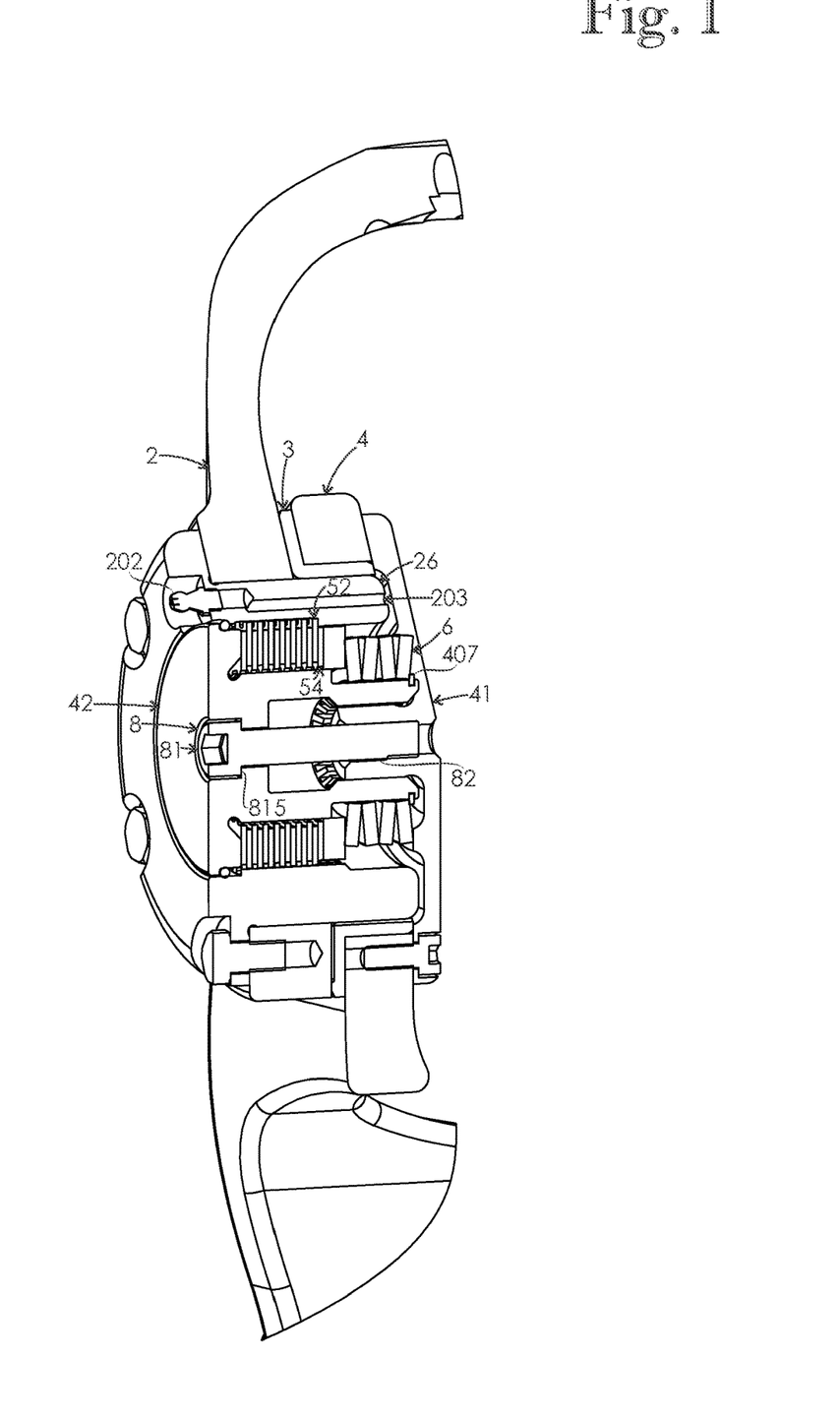
FIG. 1 shows a cross-section of a joint element according to an embodiment of the invention.

FIG. 1 shows a cross section of a joint element provided with a swing dampener brake according to an embodiment of the invention, the joint element comprising a first joint part 2, second joint part 4, a swing dampener brake, a lubrication system, and a holder member 407. In FIG. 1, the joint element is in an operational state.

The first joint part 2 comprises a sleeve part 26 whose inner surface defines a sleeve opening which in the axial direction extends inside the sleeve part 26. The second joint part 4 comprises a first end part 41 and second end part 42. The first end part 41 is bearing-mounted to the first joint part 2 by a bearing assembly 3 for turning around a turning axis, the turning axis being parallel to the axial direction and passing through the sleeve opening. The second end part 42 is detachably fixed to the first end part 41 by a joint part coupling which is adapted to transfer torque between the first end part 41 and the second end part 42, and the joint part coupling is adapted to allow the second end part 42 to be moved in the axial direction to a detached position in relation to the first end part 41. In this context, torque refers to the torque around the turning axis.

The joint part coupling between the first end part 41 and second end part 42 comprises joint part coupling grooves provided in the first end part 41, and joint part coupling protrusions provided in the second end part 42, the joint part coupling grooves and joint part coupling protrusions extending in the axial direction and being adapted to cooperate mutually to transfer torque between the first end part 41 and second end part 42. The joint part coupling between the first end part 41 and second end part 42 is a splined shaft coupling. In an alternative embodiment, the joint part coupling comprises a known joint adapted to transfer torque, only, between the first end part and second end part.

The swing dampener brake is adapted to dampen the swinging between the first joint part 2 and second joint part 4 around the turning axis. In other words, the swing dampener brake is adapted to create friction which increases the torque that is required to turn the first joint part 2 in relation to the second joint part 4 around the turning axis. The swing dampener brake thus seeks to prevent the mutual turning of the first joint part 2 and second joint part 4 by means of the friction it has created.

The swing dampener brake comprises seven first brake disc members 52, eight second brake disc members 54, and an operating system. Each first brake disc member 52 and each second brake disc member 54 is located in the axial direction inside the sleeve part 26, when the second end part 42 is in a usage position according to FIG. 1 in relation to the first end part 41.

Each first brake disc member 52 has an active surface and is connected to the inner surface of the sleeve part 26 of the first joint part 2 by a first brake disc connection which is adapted to transfer torque between the first brake disc member 52 and the sleeve part 26. The inner surface of the sleeve part 26 is a substantially cylindrical surface whose normal is perpendicular to the turning axis. The first brake disc connection comprises a plurality of sleeve grooves 264 provided in the inner surface of the sleeve part 26 and extending in the axial direction, and a plurality of outer connection protrusions provided in the outer surface of each first brake disc member 52, the outer connection protrusions cooperating with the sleeve grooves 264 of the sleeve part 26, connecting the first brake disc member 52 to the sleeve part 26 with a splined shaft coupling.

Each second brake disc member 54 has an active surface and is connected to the second joint part 4 by a second brake disc connection which is adapted to transfer torque between the second brake disc member 54 and the second joint part 4. The second brake disc connection is accomplished between each second brake disc member 54 and the second end part 42. The second brake disc connection comprises a plurality of axially extending end part grooves provided in the circumferential outer surface of the second end part 42, and a plurality of inner connection protrusions provided in the inner surface of each second brake disc member 54, the inner connection protrusions cooperating with the end part grooves of the second end part 42, connecting the second brake disc member 54 to the second end part 42 with a splined shaft coupling.

The swing dampener brake is a floating swing dampener brake. A clearance has been established in each first brake disc connection and each second brake disc connection so that reasonable wearing of the bearing assembly 3 does not substantially affect the functioning of the swing dampener brake. The clearance of each first brake disc connection is adapted to allow a small turning of the first brake disc member 52 in relation to a plane perpendicular to the turning axis, the allowed turning angle being 1 to 5°. The clearance of each second brake disc connection is adapted to allow a small turning of the second brake disc member 54 in relation to the second end part 42, in addition to which the joint part coupling between the first end part 41 and second end part 42 is adapted to allow a small turning between the first end part 41 and second end part 42 so that each second brake disc member 54 is able to turn 1 to 5° in relation to a plane perpendicular to the turning axis.

Each first brake disc member 52 and second brake disc member 54 is a circumferential member fully encircling the turning axis. The first brake disc members 52 and second brake disc members 54 are placed inside the sleeve part 26 in an alternating fashion in the axial direction. The active surface of each second brake disc member 54 is adapted to cooperate with the active surface of the adjacent first brake disc member 52 to resist the turning between the first joint part 2 and the second joint part 4. In an alternative embodiment, the swing dampener brake comprises at least one first brake disc member and at least one second brake disc member.

The bearing assembly 3 is located in the radial direction outside the sleeve opening of the sleeve part 26, and therefore also outside the first brake disc members 52 and the second brake disc members 54. The bearing assembly 3 comprises a slide bearing and is adapted to receive loading both in the radial direction and axial direction. The radial direction is perpendicular to the turning axis. In alternative embodiment, the bearing assembly may comprise a ball bearing or a roller bearing.

The operating system of the swing dampener brake is adapted to create forces in the axial direction to press the active surface of each first brake disc member 52 against the active surface of the adjacent second brake disc member 54, and thus to achieve said cooperation between the active surface of each first brake disc member 52 and the active surface of the adjacent second brake disc member 54, that is, the resisting of the turning between the first joint part 2 and the second joint part 4. Said cooperation is based on friction.

The operating system of the swing dampener brake comprises a spring assembly 6 which is adapted to press the first brake disc members 52 against the second brake disc members 54. The operating system is an adjustable operating system comprising a threaded adjustment assembly 8 to adjust the forces that the operating system applies to press the first brake disc members 52 against the second brake disc members 54. The threaded adjustment assembly 8 comprises a first threaded member 81 and a second threaded member 82. Turning the first threaded member 81 in relation to the second threaded member 82 adjusts the forces that press the first brake disc members 52 against the second brake disc members 54. The first threaded member 81 is adapted to be turned by a tool to adjust said forces, and is accessible from the side of the joint element from which the second end part 42 is adapted to be removed, whereby adjusting the operating system is possible from the same side of the joint element as the removal of the second end part 42.

The spring assembly 6 partly overlaps the bearing assembly 3 in the axial direction. The part of the spring assembly 6 that is located partly overlapping the bearing assembly 3 in the axial direction is located inside the sleeve opening of the sleeve part 26. The dimension of the spring assembly 6 in the radial direction is smaller than the diameter of the sleeve opening of the sleeve part 26. In an embodiment, the spring assembly of the operating system is located entirely overlapping the bearing assembly in the axial direction.

The spring assembly 6 comprises a plurality of cup springs. In alternative embodiments, the spring assembly comprises other types of springs, such as coil springs.

In the embodiment of FIG. 1, the first threaded member 81 comprises a bolt provided with an external thread, and the second threaded member 82 comprises an inner thread which is provided in the first end part 41 and adapted to cooperate with the external thread of the bolt. In an alternative embodiment, the first threaded member comprises a nut provided with an inner thread, and the second threaded member comprises an external thread provided in the first end part.

The first threaded member 81 comprises a pressing surface 815 adapted to cooperate with the second end part 42 to adjust the forces by means of which the operating system presses the first brake disc members 52 against the second brake disc members 54. The pressing surface 815 is a surface which is capable of directing a force directed inward in the axial direction to the second end part 42.

The adjustment assembly 8 forms part of the joint part coupling so that the cooperation between the first threaded member 81 and the second threaded member 82 is adapted to prevent detaching the second end part 42 from the first end part 41, and unscrewing the first threaded member 81 from the second threaded member 82 is adapted to allow the second end part 42 to be moved in the axial direction to a detached position in relation to the first end part 41. In other words, when the bolt of the first threaded member 81 is turned into the inner threading of the second threaded member 82, the first end part 41 and the second end part 42 cannot move in relation to each other in the axial direction whereby the joint element is able to receive loading in both radial and axial directions. In an alternative embodiment, the mutual immovability of the first end part and second end part in the axial direction is ensured by elements independent of the adjustment assembly of the operating system.

The second end part 42 is adapted in its usage position of FIG. 1 to cooperate with the first joint part 2, preventing the movement of the first joint part 2 outward in the axial direction in relation to the first end part 41, or in the direction of the detached position of the second end part 42. When the second end part 42 is in the detached position according to FIG. 2, the axial detachment of the first joint part 2 from the first end part 41 is for the most part prevented by the friction caused by the bearing assembly 3. In an alternative embodiment, the joint element is provided with a support system which is adapted to prevent the first joint part from moving in the axial direction outwards in relation to the first end part in a situation where the second end part is in the detached position. The support system may comprise e.g. a support member which is adapted to direct inward-directed forces in the axial direction to the first joint part and first end part.

The holder member 407 is adapted to restrict movement in the axial direction of the active components of the swing dampener brake in relation to the second end part 42 so that the active components of the swing dampener brake are adapted to move to the detached position along with the second end part 42. The active components of the swing dampener brake comprise the first brake disc members 52, second brake disc members 54, and spring assembly 6. In an alternative embodiment of the invention, the active components of the swing dampener brake only comprise at least one first brake disc member and at least one second brake disc member.

The holder member 407 comprises a detachable lock ring, and the second end part 42 comprises a locking groove which is adapted to cooperate with the lock ring to keep the lock ring in a holder position in the axial direction in relation to the second end part 42. In an alternative embodiment, the holder member comprises a threaded joint, such as a bolt and nut, or a bolt and an inner thread formed in the second end part.

Figure 2:
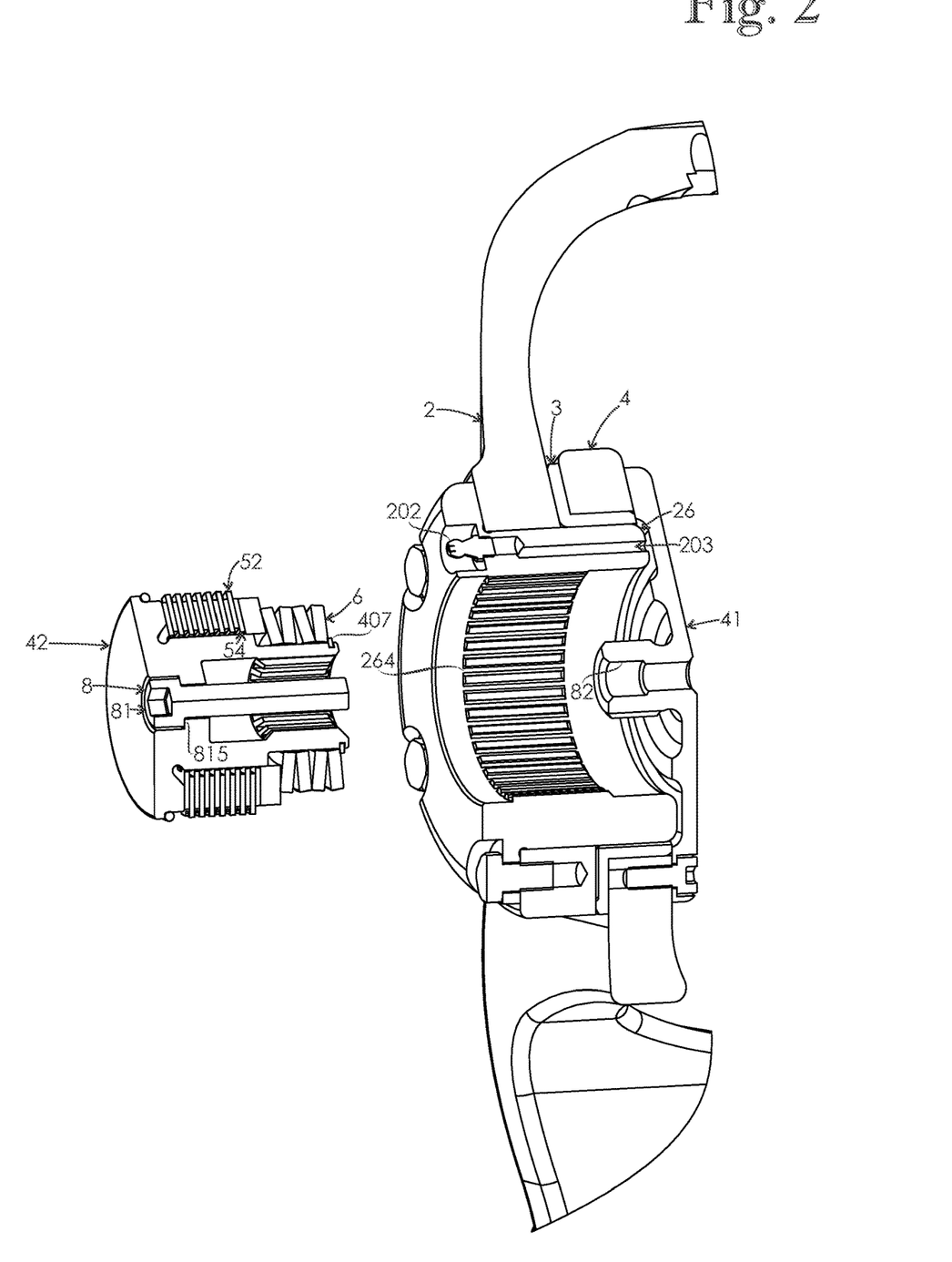
FIG. 2 shown the joint element of FIG. 1 partly dismantled.

The second end part 42 is adapted to be moved in relation to the first end part 41, between a usage position shown in FIG. 1 and a detached position shown in FIG. 2. From the situation of FIG. 1, the situation of FIG. 2 is reached by moving the second end part 42 in the axial direction in relation to the first end part 41.

In FIG. 2, each first brake disc member 52 and each second brake disc member 54 are in the axial direction located outside the sleeve part 26. The detached position of the second end part 42 makes it possible to service and replace the active components of the swing dampener brake while the first end part 41 remains bearing-mounted to the first joint part 2. In the situation of FIG. 2, the joint element is capable of receiving a load in the radial direction, that is, load perpendicular to the turning axis.

The lubrication system is adapted to lubricate the bearing assembly 3 and active components of the swing dampener brake and comprises a grease nipple 202 placed in the first joint part 2 and a lubrication channel 203 which creates a route for the lubricant from the grease nipple 202 to the bearing assembly 3. The lubrication channel 203 extends through the sleeve part 26 in the axial direction. The grease nipple 202 is accessible from the side of the joint element from which the second end part 42 is adapted to be removed, whereby it is possible to lubricate the bearing assembly 3 from the same side of the joint element as the removal of the second end part 42.

Figure 3A:
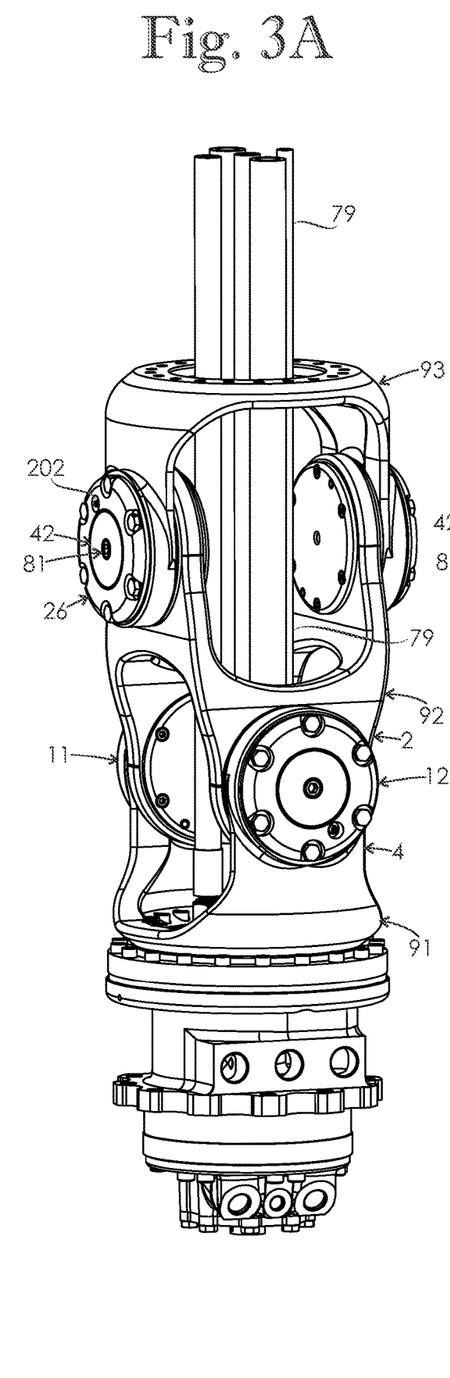
FIG. 3A shows a joint assembly comprising four joint elements according to FIG. 1.

FIG. 3A shows a joint assembly comprising a first machinery part 91, second machinery part 92, and a plurality of flexible, elongated elements 79. The joint system turnably joins the first machinery part 91 to the second machinery part 92 for turning around a turning axis of the joint system. The plurality of flexible elongated elements 79 extend between the first machinery part 91 and second machinery part 92.

The joint system comprises a first joint element 11 and a second joint element 12 which is located at a distance from the first joint element 11 in the axial direction which is parallel to the turning axis of the joint system. Both the first joint element 11 and the second joint element 12 are joint elements according to FIG. 1. The turning axes of the first joint element 11 and second joint element 12 connect to the turning axis of the joint system.

The first machinery part 91 connects the second joint part 4 of the first joint element 11 to the second joint part 4 of the second joint element 12. The second machinery part 92 connects the first joint part 2 of the first joint element 11 to the first joint part 2 of the second joint element 12. The first joint element 11 and second joint element 12 are so placed that the moving of the second end parts 42 thereof to the detached position is adapted to take place outside the joint assembly.

A portion of each flexible elongated element 79 is located between the first joint element 11 and second joint element 12 in the axial direction so that the first joint element 11 and the second joint element 12 are adapted to protect said portions of the elongated elements 79 in the axial direction. The first joint element 11 and the second joint element 12 protect the elongated elements 79 against impacts that are directed to the joint assembly from the outside in the axial direction.

The plurality of flexible elongated elements 79 comprise hydraulic hoses, a bus cable, and a hose for a stump treatment substance. In an alternative embodiment, the joint assembly comprises at least one flexible elongated element which comprises an electric cable.

In addition to the first machinery part 91 and second machinery part 92, the joint assembly of FIG. 3A comprises a third machinery part 93 which is located on the opposite side of the second machinery part 92 than the first machinery part 91. The third machinery part 93 is identical to the first machinery part 91. The joint assembly of FIG. 3A comprises all in all four joint elements according to FIG. 1. The third machinery part 93 is adapted to turn in relation to the second machinery part 92 around such an axis that is perpendicular to the turning axis around which the first machinery part is adapted to turn in relation to the second machinery part 92.

Figure 3B:
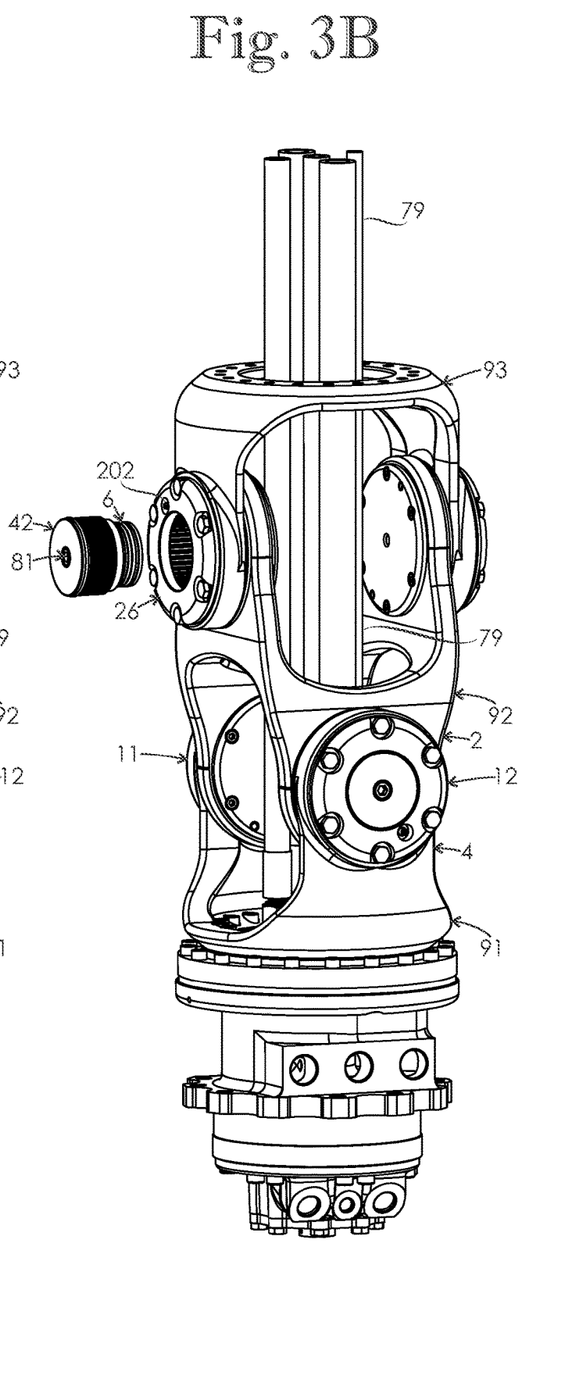
FIG. 3B shows the joint assembly of FIG. 3A with one of its joint elements partly dismantled.

FIG. 3B shows the joint assembly of FIG. 3A in a situation where the second end part 42 of the second joint part 4 of one joint elements is in the detached position in relation to the first end part 41. The second end part 42, which is in the detached position, is outside the rest of the joint assembly in the axial direction. Moving the second end part 42 to the detached position of FIG. 3B has been possible without moving the elongated elements 79 in any way, because the detached position is located in the opposite direction in relation to the elongated elements 79.

Figure 4:
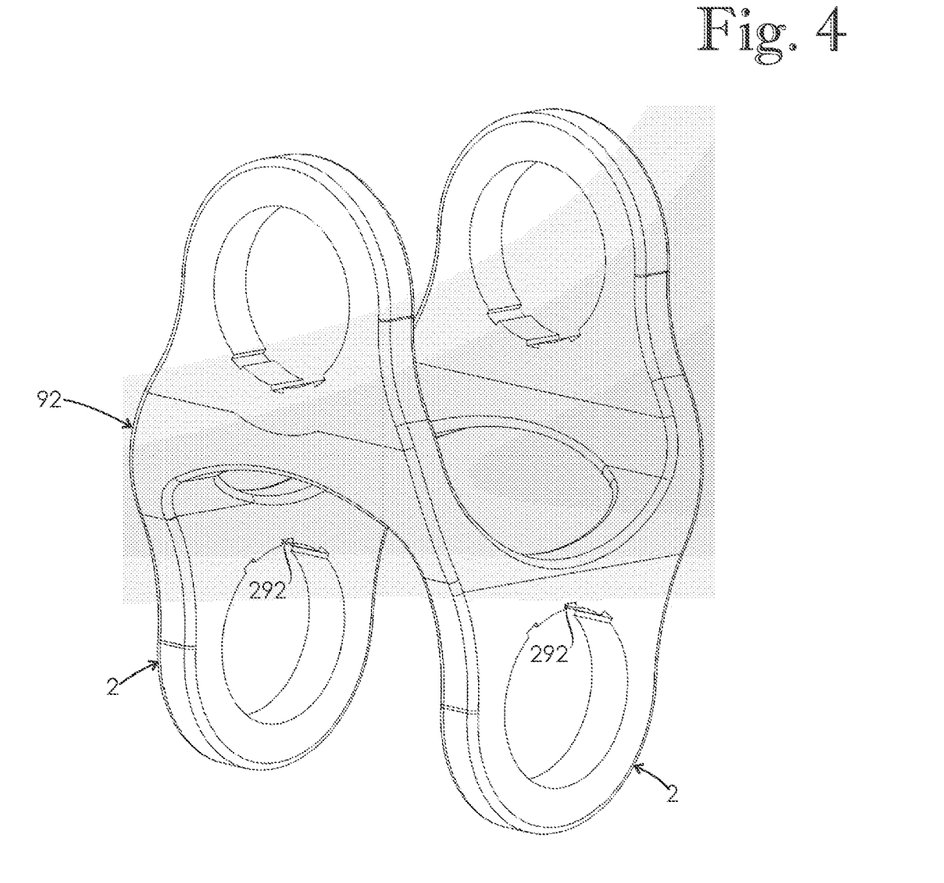
FIG. 4 shows a second machinery part of the joint assembly of FIG. 3A and parts of joint elements fixed to it.

FIG. 4 shows the second machinery part 92 of the joint assembly of FIG. 3A and parts of joint elements fixed to it. Both the sleeve part 26 of the first joint part 2 of the first joint element 11 and the sleeve part 26 of the first joint part 2 of the second joint element 12 are fixed by a wedge groove joint to the second machinery part 92, each wedge groove joint comprising three wedge grooves 292 extending in the axial direction in the second machinery part 92. The wedge groove joint is placed, when examined in the circumferential direction, asymmetrically so that the wedge grooves 292 are located in an area to which a smaller than average loading is focused in a use situation of the joint assembly. In this context, circumferential direction is the direction circumferentially encircling the turning axis of the joint system.

With reference to FIG. 4, in a use situation the first joint element 11 and the second joint element 12 focus a load on the second machinery part 92, which for the most part is directed downward or obliquely downward in relation to the turning axis of the joint system, so that the wedge grooves 292 are placed on the top side of the turning axis of the joint system. In an alternative embodiment of the invention, both the sleeve part of the first joint part of the first joint element and the sleeve part of the first joint part of the second joint element are fixed by a wedge groove joint to the second machinery part, each wedge groove joint comprising at least one wedge groove extending in the axial direction in the second machinery part, the wedge groove joint being placed, when examined in the circumferential direction, asymmetrically so that at least one the wedge groove is centred in an area to which a smaller than average load is focused in a use situation of the joint assembly.

Figure 5:
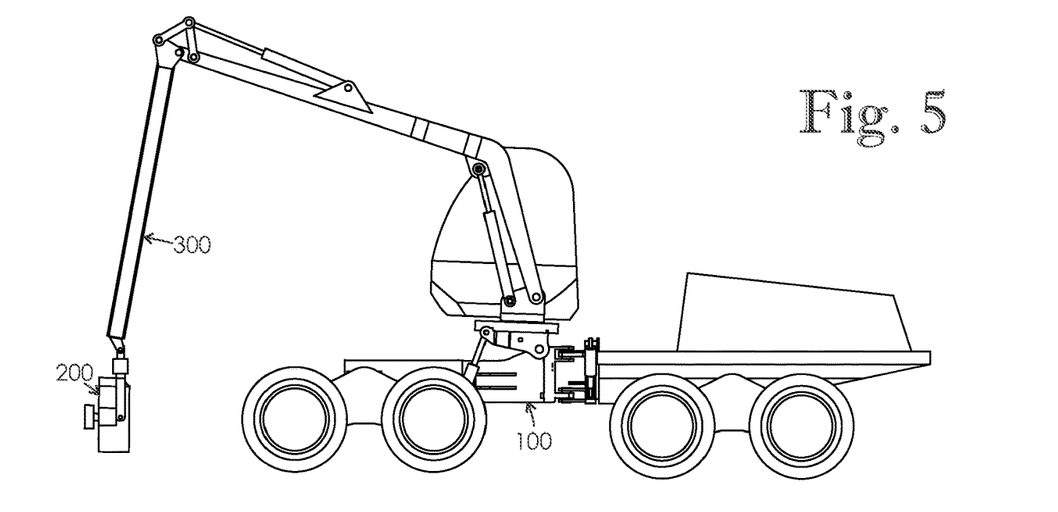
FIG. 5 is a schematic view of a machine which is provided with a boom and may be provided with the joint assembly according to FIG. 3A.

FIG. 5 is a schematic view of a machine which is provided with a boom and may be provided with the joint assembly according to FIG. 3A. The machine of FIG. 5 comprises a body part 100, operative head 200, and a boom 300 joining the body part 100 to the operative head 200. The boom 300 comprises a first boom part, a second boom part, and a joint assembly which turnably joins the first boom part to the second boom part. The joint assembly that connects the first boom part and second boom part may be replaced by the joint assembly according to FIG. 3A.

The FIG. 5 machine provided with a boom is a harvester the operative head 200 of which is a harvester head. When the harvester of FIG. 5 is provided with the joint assembly of FIG. 3A, the harvester head is capable of turning around such an axis that is perpendicular to both the turning axes of the joint assembly. The joint assembly according to the invention may be used on other types of forest work machines, too, such as forwarders, and other types of machines provided with a boom, such as a grab machine.

It will be apparent to a person skilled in the art that the basic idea of the invention may be implemented in many different ways. The invention and its embodiments are thus not restricted to the above-described examples but may vary within the scope of the claims.

The invention claimed is:

1. A joint element provided with a swing dampener brake and comprising:

a first joint part which comprises a sleeve part whose inner surface defines a sleeve opening which extends inside the sleeve part in an axial direction;

a second joint part comprising a first end part which is bearing-mounted to the first joint part by a bearing assembly for turning around a turning axis, the turning axis being parallel to the axial direction and passing through the sleeve opening;

a swing dampener brake which is adapted to dampen the swinging between the first joint part and second joint part around the turning axis, the swing dampener brake comprising:

at least one first brake disc member having an active surface and being connected to the inner surface of the sleeve part of the first joint part by a first brake disc connection which is adapted to transfer torque between the at least one first brake disc member and the sleeve part;

at least one second brake disc member having an active surface and being connected to the second joint part by a second brake disc connection which is adapted to transfer torque between the at least one second brake disc member and the second joint part, and the active surface of the at least one second brake disc member is adapted to cooperate with the active surface of the at least one first brake disc member to resist the turning between the first joint part and the second joint part; and an operating system, adapted to create forces to press the active surface of the at least one first brake disc member against the active surface of the at least one second brake disc member, and thus to achieve said cooperation between the active surface of the at least one first brake disc member and the active surface of the at least one second brake disc member, and the second joint part comprises a second end part which is detachably fixed to the first end part by a joint part coupling which is adapted to transfer torque around the turning axis between the first end part and the second end part, and the joint part coupling is adapted to allow the second end part to be moved in the axial direction to a detached position in relation to the first end part, the detached position allowing the replacement of active components of the swing dampener brake while the first end part remains bearing-mounted to the first joint part, the active components of the swing dampener brake comprising the at least one first brake disc member and the at least one second brake disc member, wherein the bearing assembly is located in a radial direction outside the sleeve opening of the sleeve part, and outside the at least one first brake disc member and the at least one second brake disc member.

2. The joint element as claimed in claim 1, wherein the second brake disc connection between the at least one second brake disc member and the second joint part is provided between the at least one second brake disc member and the second end part.

3. The joint element as claimed in claim 1, wherein the joint element comprises a holder element which is adapted to restrict movement in the axial direction of the active components of the swing dampener brake in relation to the second end part so that the active components of the swing dampener brake are adapted to move to the detached position along with the second end part.

4. The joint element as claimed in claim 3, wherein holder member comprises a detachable lock ring, and the second end part comprises a locking groove which is adapted to cooperate with the lock ring to keep the lock ring in a holder position in the axial direction in relation to the second end part.

5. The joint element as claimed in claim 1, wherein the joint element comprises a lubrication system which is adapted to lubricate the bearing assembly, and comprises a grease nipple placed in the first joint part and a lubrication channel which creates a route for the lubricant from the grease nipple to the bearing assembly, the grease nipple being accessible from the side of the joint element from which the second end part is adapted to be removed.

6. The joint element as claimed in claim 1, wherein the operating system comprises a spring assembly which is adapted to press the at least one first brake disc member against the at least one second brake disc member, and the active components of the swing dampener brake comprise the spring assembly.

7. The joint element as claimed in claim 1, wherein the operating system is an adjustable operating system comprising a threaded adjustment assembly to adjust the forces that the operating system applies to press the at least one first brake disc member against the at least one second brake disc member, the threaded adjustment assembly comprising a first threaded member and a second threaded member, one of which comprising an external thread and the other an internal thread, which are adapted to cooperate in such a manner that turning the first threaded member in relation to the second threaded member adjusts the forces that press the at least one first brake disc member against the at least one second brake disc member, the first threaded member being adapted to be turned by a tool to adjust said forces, and being accessible from the side of the joint element from which the second end part is adapted to be removed.

8. The joint element as claimed in claim 7, wherein the first threaded member comprises a pressing surface adapted to cooperate with the second end part to establish said forces of the operating system.

9. The joint element as claimed in claim 8, wherein the adjustment assembly forms part of the joint part coupling so that the cooperation between the first threaded member and the second threaded member is adapted to prevent detaching the second end part from the first end part, and unscrewing the first threaded member from the second threaded member is adapted to allow the second end part to be moved in the axial direction to a detached position in relation to the first end part.

10. The joint element as claimed in claim 1, wherein the joint part coupling comprises at least one joint part coupling groove provided in one of the first end part and second end part, and at least one joint part coupling protrusion provided in the other of the first end part and second end part, the at least one joint part coupling groove and the at least one joint part coupling protrusion extending in the axial direction and being adapted to cooperate mutually to transfer torque between the first end part and second end part.

11. A joint assembly comprising:
a first machinery part;
a second machinery part;
a joint system which turnably joins the first machinery part to the second machinery part for turning around a turning axis of the joint system, and comprises a first joint element and a second joint element which is located at a distance from the first joint element in the axial direction which is parallel to the turning axis of the joint system, whereby the first machinery part connects the first joint part of the first joint element to the first joint part of the second joint element, and the second machinery part connects the second joint part of the first joint element to the second joint part of the second joint element; and
at least one flexible elongated element which extends between the first machinery part and second machinery part, a portion of the at least one flexible elongated element is located between the first joint element and second joint element in the axial direction so that the first joint element and the second joint element are adapted to protect said portion of the at least one elongated element in the axial direction,
wherein both the first joint element and second joint element are joint elements according to claim 1, and the first joint element and second joint element are so placed that the moving of the second end part to the detached position is adapted to take place outside the joint assembly.

12. The joint assembly as claimed in claim 11, wherein the at least one flexible elongated element comprises one or more of the following: a hydraulic hose, bus cable, and electric wire.

13. The joint assembly as claimed in claim 11, wherein both the sleeve part of the first joint part of the first joint element and the sleeve part of the first joint part of the second joint element are fixed by a wedge groove joint to the second machinery part, each wedge groove joint comprising at least one wedge groove extending in the axial direction in the second machinery part, the wedge groove joint being placed, when examined in the circumferential direction, asymmetrically so that the at least one wedge groove is concentrated in an area to which a smaller than average load is directed in a use situation of the joint assembly.

14. A work machine provided with a boom, comprising:
a body part;
an operative head; and
a boom which connects the body part to the operative head and comprises a first boom part, a second boom part, and a joint assembly which turnably joins the first boom part to the second boom part,
wherein the joint assembly is a joint assembly as claimed in claim 11.

15. The work machine as claimed in claim 14, wherein the work machine is a forest work machine or a grab machine.

* * * * *